United States Patent [19]
Kölle et al.

[11] Patent Number: 5,658,840
[45] Date of Patent: Aug. 19, 1997

[54] PREPARATION OF ZIEGLER-NATTA TYPE CATALYST SYSTEMS

[75] Inventors: Peter Kölle, Bad Dürkheim; Patrik Müller, Kaiserslautern; Rainer Hemmerich, Grünstadt; Erich Kolk, Bad Dürkheim, all of Germany

[73] Assignee: BASF Aktiengesellschaft, Ludwigshafen, Germany

[21] Appl. No.: 457,280

[22] Filed: Jun. 5, 1995

[30] Foreign Application Priority Data

Jun. 7, 1994 [DE] Germany ............... 44 19 845.0

[51] Int. Cl.$^6$ .................................... C08F 4/64
[52] U.S. Cl. ................. 502/104; 502/103; 502/126; 210/304
[58] Field of Search ................... 502/103, 104, 502/126; 210/304

[56] References Cited

U.S. PATENT DOCUMENTS

| | | | |
|---|---|---|---|
| 3,802,570 | 4/1974 | Dehne | 210/304 |
| 4,477,588 | 10/1984 | Hawley | 502/119 |
| 4,617,285 | 10/1986 | Albizzati | 502/103 |
| 4,650,842 | 3/1987 | Speca et al. | 526/100 |
| 4,732,882 | 3/1988 | Allen et al. | 502/103 |
| 4,857,613 | 8/1989 | Zolk et al. | |
| 5,173,463 | 12/1992 | Luciani et al. | 502/103 |
| 5,229,476 | 7/1993 | Hara et al. | 502/125 |
| 5,275,991 | 1/1994 | Buehler et al. | 502/103 |
| 5,300,470 | 4/1994 | Cuffiani et al. | 502/103 |

*Primary Examiner*—Glenn A. Caldarola
*Attorney, Agent, or Firm*—Keil & Weinkauf

[57] ABSTRACT

A process for the preparation of Ziegler-Natta type catalyst systems, containing, as active constituents a) a titanium-containing solid component, which contains in addition to a compound of titanium at least one electron donor compound, and is present in an inert solvent in the form of a suspension, and, as co-catalyst, b) an aluminum compound and c) optionally further electron donor compounds in which, following the preparation of the titanium-containing solid component a), the inert solvent present in the suspension is removed by first filtering the suspension in a first step, and then removing further solvent from the filtered material in a second step by applying a pressure difference at temperatures of not more than 100° C.

9 Claims, No Drawings

PREPARATION OF ZIEGLER-NATTA TYPE CATALYST SYSTEMS

The present invention relates to a process for the preparation of Ziegler-Natta type catalyst systems containing as active constituents a) a titanium-containing solid component, which contains in addition to a compound of titanium at least one electron donor compound, and is present in an inert solvent in the form of a suspension, and as co-catalyst b) an aluminum compound and c) optionally further electron donor compounds.

In addition, the present invention also relates to the Ziegler-Natta type catalyst systems which can be obtained using the process of the invention.

Ziegler-Natta type catalyst systems are disclosed, for example, in EP-B 14,523, EP-A 23,425, EP-A 45,975, U.S. Pat. No. 4,857,613 and EP-A 195,497. These systems are used in particular for the polymerisation of α-olefins and contain, inter alia, compounds of polyvalent titanium, aluminum halides and/or alkyls, and electron donor compounds, in particular silicon compounds, ethers, carboxylic acid esters, ketones and lactones, which are used on the one hand in combination with the titanium compound and on the other hand as co-catalysts.

In order to ensure economical polyolefin production, such catalyst systems must have, among other properties, high productivity, by which is meant the ratio of the amount of polymer formed to the amount of catalyst used. Furthermore it is necessary for the polymers obtained that they be as stereospecific as possible, ie, the amount of non-isotactic molecular structures in homopolymers should not exceed 2 to 2.5%.

The prior art catalyst systems are usually prepared by multistage processes in inert solvents, for example in alkanes. U.S. Pat. No. 4,857,613 describes, inter alia, a two-stage process which is carried out in n-heptane as solvent.

A drawback of this manufacturing process is, inter alia, that the catalysts are formed in suspended form. This causes dosage problems and problems in the transportation of the catalysts via the usual means of transport, since the suspension must be re-homogenized prior to dosing the catalyst system. Furthermore it would be desirable for process engineering reasons for such catalyst systems to be available in a free-flowing form, which is naturally not the case with suspended catalysts.

It was thus the object of the present invention to overcome the above drawbacks and to provide a novel process for the preparation of Ziegler-Natta type catalysts, with which very free-flowing and storable catalysts can be obtained which also have high productivity and stereospecificity.

Accordingly, a process has been developed for the preparation of Ziegler-Natta type catalyst systems, which contain, as active constituents, a) a titanium-containing solid component, which contains in addition to a compound of titanium at least one electron donor compound, and is present in an inert solvent in the form of a suspension, and, as co-catalyst, b) an aluminum compound and c) optionally further electron donor compounds wherein, following the preparation of the titanium-containing solid component a), the inert solvent present in the suspension is removed by first filtering the suspension in a first step, and then removing further solvent from the filtered material in a second step by applying a pressure difference at temperatures of not more than 100° C.

Suitable Ziegler-Natta type catalyst systems usually contain a titanium-containing solid component a) and, as co-catalyst, an aluminum compound b) and optionally electron donor compounds c).

The titanium compounds used for the preparation of the titanium-containing solid component are generally halides or alcoholates of trivalent or tetravalent titanium, the chlorides of titanium, in particular titanium tetrachloride, being preferred. Advantageously, the titanium-containing solid component also contains a finely divided support, for which purpose silicon and aluminum oxides and aluminum silicates have given good results. A particularly preferred support is $SiO_2 \cdot aAl_2O_3$, where a stands for a value in the range of 0 to 2, in particular in the range of 0 to 0.5.

In addition, compounds of magnesium are advantageously used in the preparation of the titanium-containing solid component. Suitable magnesium compounds for this purpose are magnesium halides, magnesium aryls, magnesium alkyls and magnesiumalkoxy compounds and magnesiumaryloxy compounds, whilst magnesium dichloride, magnesium dibromide and magnesium($C_1$-$C_{10}$ alkyl) compounds are particularly used. In addition, the titanium-containing solid component a) can contain halogen, preferably chlorine or bromine.

Furthermore, the titanium-containing solid component a) also contains electron donor compounds such as mono- or poly-functional carboxylic acids, carboxylic anhydrides and carboxylic acid esters, and also ketones, ethers, alcohols, lactones, and organophosphorus and organosilicon compounds. Electron donor compounds which are preferably present in the titanium-containing solid component a) are in particular carboxylic anhydrides and carboxylic acid esters.

The preferred carboxylic anhydrides or carboxylic acid esters include phthalic acid derivatives of the general formula (I), for example,

In which X and Y individually stand for chlorine or a $C_1$-$C_{10}$ alkoxy radical of together stand for oxygen. Particularly preferred electron donor compounds are phthalates, in which X and Y denote $C_1$-$C_8$ alkoxy radicals, for example methoxy, ethoxy, propyloxy or butyloxy radicals.

In addition, preferred electron donor compounds present in the titanium-containing solid component are, inter alia, diesters of 3-membered or 4-membered, optionally substituted cycloalkyl-1,2-dicarboxylic acids, and monoesters of optionally substituted benzophenone-2-carboxylic acids. The hydroxy compounds used for these esters are the alcohols normally employed in transesterification reactions, inter alia $C_1$-$C_{15}$ alkanols, $C_5$-$C_7$ cycloalkanols, which can in turn carry $C_1$-$C_{10}$ alkyl groups, and also $C_6$-$C_{10}$ phenols.

The titanium-containing solid component can be prepared by known methods. Examples thereof are described, inter alia, in EP-A 45,975, EP-A 45,977, EP-A 86,473, EP-A 171,200, U.S. Pat. No. 4,857,613, GB-A 2,111,066 and DE-A 4,004,087.

Preferably the following two-stage process is used for the preparation of the titanium-containing solid component a).

In the first stage, a finely divided support, preferably $SiO_2 \cdot aAl_2O_3$—where a designates a number in the range of 0 to 2, in particular in the range of 0 to 0.5—which generally exhibits a particle size of from 0.1 to 1000 µm, in particular from 10 to 300 µm, a porosity of from 0.1 to 10 cm³/g, in particular from 1.0 to 4.0 cm³/g, and a specific surface area of from 10 to 1000 m²/g, in particular from 100 to 500 m²/g, is first of all mixed with a solution of the magnesium-containing compound in a liquid alkane, after which this mixture is stirred for from 0.5 to 2 hours at a temperature between 10° and 120° C. Preferably there is used from 0.1 to 1 mol of the magnesium compound per mole of $SiO_2 \cdot aAl_2O_3$. Then halogen or a hydrogen halide, in particular chlorine or hydrogen chloride, is added with constant stirring in at least two-fold, preferably at least five-fold, molar excess based on the magnesium-containing compound. After approximately 30 to 120 minutes there is added to this reaction product, at a temperature between 10° and 150° C., a $C_1$–$C_8$ alkanol, in particular ethanol, a halide, or an alcoholate of trivalent or tetravalent titanium, in particular titanium tetrachloride, and a carboxylic acid ester. In this process there are used, per mole of magnesium in the magnesium-containing compound, from 1 to 5 mol, in particular from 2 to 4 mol of alkanol, from 2 to 20 mol, in particular from 4 to 10 mol, of trivalent or tetravalent titanium, and from 0.01 to 1 mol, in particular 0.1 to 0.5 mol, of the carboxylic acid ester. The mixture is stirred for at least an hour at a temperature between 10° and 150° C., the resulting solid substance then being removed by filtration, and washed with a $C_7$–$C_{10}$ alkyl benzene, in particular ethyl benzene.

In the second stage, the solids obtained from the first stage are extracted for some hours at temperatures between 100° and 150° C. with excess titanium tetrachloride or with a solution, present in excess, of titanium tetrachloride in an inert solvent preferably an alkyl benzene, in which the solvent contains at least 5 wt % of titanium tetrachloride. Afterwards the product is washed with a liquid alkane until the content of titanium tetrachloride in the washing liquid is less than 2 wt %.

The titanium-containing solid component a) obtained in this manner is used together with co-catalysts as a Ziegler-Natta catalyst system. Particularly suitable co-catalysts in this process are aluminum compounds. Preferably electron donor compounds c) are used in addition to an aluminum compound b) as further co-catalysts.

Suitable aluminum compounds b) are, apart from trialkylaluminum, those compounds in which an alkyl group is replaced by an alkoxy group or by a halogen atom, for example by a chlorine or bromine atom. Trialkylaluminum compounds are preferably used whose alkyl groups have in each case from 1 to 8 C atoms, for example trimethylaluminum, triethylaluminum or methyldiethylaluminum.

In addition to the titanium-containing solid component a) and the aluminum compound b) Ziegler-Natta catalyst systems also preferably contain electron donor compounds c), such as mono- or poly-functional carboxylic acids, carboxylic anhydrides and carboxylic acid esters, and also ketones, ethers, alcohols, lactones, and organophosphorus and organosilicon compounds. Electron donor compounds preferably used as co-catalysts are organosilicon compounds of the formula II

$$R^1{}_n Si(OR^2)_{4-n} \qquad (II)$$

in which
R¹ denotes a $C_1$–$C_{20}$ alkyl group, a 5-membered to 7-membered cycloalkyl group, which can in turn carry a $C_1$–$C_{10}$ alkyl group, or a $C_6$–$C_{20}$ aryl or arylalkyl group,
R² denotes a $C_1$–$C_{20}$ alkyl group, and
n stands for the integer 1, 2 or 3.

Particularly preferred compounds in this process are those in which R¹ denotes a $C_1$–$C_8$ alkyl group or a 5-membered to 7-membered cycloalkyl group, and R² denotes a $C_1$–$C_4$ alkyl group, and n stands for the number 2.

Of these compounds, dimethoxydiisopropylsilane, dimethoxyisobutylisopropylsilane, dimethoxydiisobutylsilane, diethoxyisobutylisopropylsilane, dimethoxy-sec-butylisopropylsilane, dimethoxyisobutyl-sec-butylsilane, dimethoxydi-sec-butylsilane, dimethoxycyclopentylmethylsilane, and dimethoxydicyclopentylsilane may be mentioned in particular.

Those Ziegler-Natta catalyst systems are preferred in which the atomic ratio of aluminum in the aluminum compound b) to titanium in the titanium-containing solid component a) is from 10:1 to 800:1, in particular from 20:1 to 200:1, and the molar ratio of the aluminum compound b) to the further electron donor compound c) is from 1:1 to 100:1, in particular from 2:1 to 80:1.

According to the process of the invention for the preparation of Ziegler-Natta type catalyst systems the inert solvent present in the suspension is removed following the preparation of the titanium-containing solid component a) by first of all filtering the suspension in a first step. The filtration is carried out by means of conventional filtering equipment, for example inertizable and heatable combined pressure and suction filters, under usual pressure and temperature conditions, for example under a pressure of from 5 to 500 mbar and at a temperature of from 20° to 100° C. Preferably the filtration takes place under a pressure of from 50 to 450 mbar and at temperatures of from 30° to 70° C. Advantageously, a heavy-duty steel gauze having a mesh size of from 10 to 30 μm can be used as filter cloth for the filtration. The filtration can be also carried out, in particular, by applying a stream of nitrogen, or a stream of some other inert gas, under a superatmospheric pressure of from 1 to 5 bar.

In this manner it is possible to remove approximately from 50 to 70% of the solvent originally present. On completion of the first step the remaining filter cake still contains up to 30 to 50 wt % of solvent. The concentration thereof can now be reduced further in a second step, which normally follows directly on the filtration.

In the second step, further solvent is extracted, in a first embodiment, by applying a pressure difference to the filtered material.

This can take place, among other ways, as follows: the solvent is removed by distillation in the second step by applying to that side of the filtering apparatus which is remote from the solvent-containing solid component a) a vacuum of from 5 to 500 mbar, in particular from 50 to 450 mbar, at a temperature of from 20° to 100° C., in particular from 30° to 70° C. This second step can likewise be carried out by means of usual vacuum-proof filtering equipment, for example combined pressure and suction filters. In this process it has proven to be advantageous for the pressure reduction necessary for the application of a vacuum to take place in at least two sub-steps at different rates of reduction over a total period of from 1 to 10 hours, in particular over a total period of from 2 to 8 hours. The solvent thus vaporized is advantageously condensed in a cooled separator.

The applied vacuum can be removed on completion of the removal of the solvents by distillation by the introduction of an inert gas, for example nitrogen. This step is carried out usually over a period of from 0.1 to 1.0 hour, in particular from 0.2 to 0.5 hour.

Alternatively, the solvent can be removed, in a further embodiment of the second step of the preparation process of the invention, by applying a stream of inert gas under a superatmospheric pressure of from 1 to 5 bar by blowing it against the flow plate of a vortex tube in which the solvent-containing solid component a) is present. The stream of inert gas has a gas velocity in this process of preferably from 5 to 100 cm/s. For this purpose the solid component a), still containing solvent on completion of the filtration in the first step, is placed in a vortex tube containing, inter alia, a supporting plate consisting of a perforated panel in which the perforations have a diameter of approximately from 10 to 50 ram. Preferably the supporting plate can also be covered with a heavy-duty steel gauze acting as filter cloth, this having a mesh size of approximately 10 to 30 μm. Suitable vortex tubes are the vortex tubes conventionally used in industry, of which the length and diameter can be varied appropriately.

According to the process of the invention, the solvent is removed in the second step preferably by blowing the inert gas, for example nitrogen, against the flow plate at a velocity of from 5 to 100 cm/s, in particular from 10 to 30 cm/s. In this process it can be recommendable to preheat the inert gas to temperatures of from approximately 25° to 70° C.

In this manner, the inert gas flows through the fixed bed comprising solvent-containing solid component a) and entrains solvent via the flow plate and the perforated panel, which solvent is advantageously condensed in a cooled separator. This second step carried out in a vortex tube usually takes from 1 to 10 hours, in particular from 1.5 to 8 hours.

Furthermore, the residual solvent still remaining in the filter cake after the first step can be alternatively removed, in accordance with another embodiment of the second step of the process of the invention, by pressing a stream of inert gas preheated to from 30° to 70° C. preferably at a velocity of from 1 to 10 m$^3$/h downwardly through the filter cake. This preferably takes place over a period of 1 to 10 hours, nitrogen being used as inert gas.

On completion of the second step in accordance with the process of the invention, the titanium-containing solid component a) is thus obtained in the form of a free-flowing powder having a residual content of solvent of from approximately 1 to 30 wt %, in particular from 1.5 to 15 wt %. The second step of the process of the invention can be carried out .either as a distillation process under reduced pressure and at elevated temperatures or as a blow-off process using a stream of inert gas under pressure.

The process of the invention makes available very free-flowing and storable titanium-containing solid components a). The process is suitable for the solvents commonly used in industry based on aliphatic and aromatic solvents and also for polar solvents. Examples of such solvents are, inter alia, n-hexane n-heptane, n-octane, or toluene. The process of the invention can be carried out without the use of elaborate apparatus or elaborate process engineering techniques.

The titanium-containing solid component a) obtained in this process is then combined with suitable co-catalysts, for example aluminum compounds b) and optionally electron donor compounds c) to form Ziegler-Natta type catalyst systems. These catalyst systems are likewise included in the invention and are more stable and show better storage properties than conventional catalyst systems and are suitable, in particular, for the polymerisation of $C_2$–$C_{10}$alk-1-enes, for example ethylene, propylene or but-1-ene. The polymerisation of $C_2$–$C_{10}$alk-1-enes is usually carried out at temperatures of from 40° to 100° C., in particular from 50° to 90° C. and pressures, of from 20 to 100 bar, in particular from 25 to 50 bar and at average residence times of the reaction mixture of from 0.5 to 5 hours, in particular from 1.0 to 4 hours. The catalyst systems of the invention are characterized, inter alia, by high productivity and stereospecificity.

EXAMPLES

Example 1

I. Preparation of a titanium-containing solid component a)

The titanium-containing solid component a) was prepared according to the following two-stage procedure.

In this process $SiO_2$, which had a particle size of 20 to 45 μm, a porosity of 1.75 cm$^3$/g and a surface area of 320 m$^2$/g, was mixed in a first stage, with butyloctylmagnesium dissolved in n-heptane, 0.3 mol of the magnesium compound being used per mole of $SiO_2$. The reaction mixture was stirred for 1.5 hours at a temperature of 90° C., after which it was cooled to 40° C., and then ten times the molar amount, based on the organomagnesium compound, of hydrogen chloride was introduced. After a period of 30 minutes the solid-phase product was separated from the solvent.

The product obtained in the first stage was admixed with n-heptane, and then 3 mol of ethanol, based on 1 mol of magnesium, were added with constant stirring. This mixture was stirred for 1.5 hours at a temperature of 80° C., and admixed afterwards with 6 mol of titanium tetrachloride and 0.5 mol of di-n-butyl phthalate, in each case based on 1 mol of magnesium. The reaction mixture was stirred for a further two hours, after which the solids were separated from the solvent by filtration.

The product thus obtained was extracted for four hours at a temperature of 125° C. with a 15 wt % strength solution of titanium tetrachloride in ethyl benzene. Afterwards the solid product was separated from the extracting agent by filtration and washed with n-heptane until the washings contained 0.3 wt % of titanium tetrachloride.

The resulting titanium-containing solid component was in the form of a suspension in n-heptane and contained 3.7 wt % of titanium, 7.5 wt % of magnesium and 28.3 wt % of chlorine.

II. Preparation of the titanium-containing solid component 8 kg of the suspension of solids obtained in (I) was placed in a nitrogen-purged Loeffler combined pressure and suction filter (NV=60). The filter cloth used consisted of a heavy-duty steel gauze having a maximum mesh size of 20 μm.

First of all, nitrogen was forced in to remove the solvent by filtration, after which the jacket of the combined pressure and suction filter was heated to 60° C. with water acting as heat-transfer medium. When the internal temperature had exceeded 50° C. the pressure in the filter press was lowered in two steps, first from 1026 to 450 mbar in 20 min and then from 450 to 150 mbar in 300 min. The vaporized solvent was collected in a separator cooled to −40° C. The rate of distillation varied over a range of from 0.5 to 5.0 L/h. A total of 12.3 L of condensate were obtained. At the end of the pressure wedge the vacuum of the combined pressure and suction filter was broken with nitrogen. The dried catalyst was obtained in the form of a fully free-flowing powder, in which the residual content of solvent was 12 wt % of n-heptane.

III. Polymerisation

A steel autoclave having a capacity of 10 L and equipped with a blade mixer was charged with 50 g of a propylene homopolymer having a melt flow index of 8.0 g/10 min, as measured by DIN 53735 at a temperature of 230° C. and under a load of 2.16 kg, 10 mmol of triethylaluminum, in the form of a 1M solution in n-heptane, 1 mmol of dimethoxyisobutylisopropylsilane, in the form of a 1M solution in n-heptane, 5 L (STP) of hydrogen and finally 100 mg of the catalyst component a) described above, at a temperature of 30° C. The reactor temperature was raised over a period of 10 min to 75° C., whilst at the same time the reactor pressure was raised to 28 bar by forcing in gaseous propylene.

When the aforementioned reaction conditions had been reached, the polymerisation was carried out with constant stirring at a temperature of 75° C. and a pressure of 28 bar over a period of 75 min. Consumed monomer was continuously replaced by fresh monomer.

The productivity of the catalyst system and the stereospecificity of the resulting propylene polymer, expressed in terms of the heptane-soluble content, can be taken from the table below.

Example 2

4 kg of the suspension of solids a) prepared in Example 1 (I) were introduced into a nitrogen-purged vortex tube having a length of 1200 mm and a diameter of the holes of 250 mm. The vortex tube contained a supporting plate, consisting of a perforated panel having a hole diameter of 15 mm and covered with a heavy-duty steel gauze having a maximum mesh size of 20 µm.

In the first step of the preparation process, the suspension was first of all subjected to filtration under an excess pressure of nitrogen. Then, in the second step of the preparation process, a stream of nitrogen preheated to 30° C. was blown against the flow plate at a velocity of 10 cm/s and thus passed through the fixed bed containing the suspension.

The discharged solvent was collected in a separator cooled to −78° C. There were obtained 6.3 L of solvent. After 240 min, the drying process was stopped. A very free-flowing powder having a residual heptane content of 1.7 wt % was obtained. The solid component a) obtained was afterwards subjected to a propylene polymerization similar to that described in Example 1 (III), the corresponding results for Example 2 being listed in the table below.

Example 3

Example 1 was repeated under otherwise identical conditions except that step II of this example was modified such that, following the removal, by filtration, of the n-heptane, a stream of nitrogen heated to 70° C. was passed through at a velocity of 5 m³/h (amount based on 25° C.) for a total of 4 hours.

The dried catalyst had a residual content of solvent of 6 wt % of n-heptane.

Comparative Example A

Example 2 was repeated under analogous conditions except that the vortex tube was heated externally such that the removal of the solvents took place at a temperature in the fixed bed of 160° C. The residual heptane content of the solid component a) obtained was 0.5 wt %.

The solid component a) obtained in this manner was afterwards subjected to a propylene polymerization similar to that described in Example 1 (III). The corresponding results for Comparative Example A are listed in the table below.

TABLE

|  | Examples | | | Comparative |
| --- | --- | --- | --- | --- |
|  | 1 | 2 | 3 | Example A |
| Productivity [g of polypropylene/g of catalyst] | 15400 | 15100 | 14850 | 8600 |
| Stereospecificity [heptane-soluble content] | 1.5% | 1.6% | 1.4% | 1.6% |

The table shows, inter alia, that the catalyst systems obtained by the process of the invention exhibit, inter alia, a higher productivity than the catalyst systems in which the solvents were removed using less gentle treatment (temperatures>100° C.).

We claim:

1. A process for the preparation of Ziegler-Natta systems, containing as active constituents
    a) A titanium-containing solid component, which contains in addition to a compound of titanium at least one electron donor compound, and is present in an inert solvent in the from of a suspension, and as co-catalyst,
    b) an aluminum compound and
wherein, following the preparation of the titanium-containing solid component a), the inert solvent present in the suspension is removed by first filtering the suspension in a first step by applying a stream of nitrogen to the suspension under a pressure of 1 to 5 bar and using a heavy-duty steel gauze having a mesh size of 10 to 30 µm, as filter cloth, and then removing further solvent from the filtered material in a second step by applying a pressure difference at temperatures of not more than 100° C.

2. A process as defined in any of claim 1, wherein the solvent is removed, by distillation, in the second step by applying a vacuum of 5 to 500 mbar and using a temperature of from 20° to 100° C.

3. A process as defined in claim 2, wherein the solvent is removed in the second step in a vacuum of from 50 to 450 mbar and at a temperature of from 30° to 70° C.

4. A process as defined in claim 2, wherein the pressure reduction necessary for the application of the vacuum takes place in at least two sub-steps over a total period of from 1 to 10 hours.

5. A process as defined in claim 1, Wherein the solvent is removed in the second step by passing a stream of inert gas heated at from 30° to 70° C. downwardly through the solvent-containing solid component a).

6. A process as defined in claim 1, wherein the solvent is removed in the second step by causing a stream of inert gas to blow against the flow plate of a vortex tube containing the solvent-containing solid component a) under a pressure of from 1 to 5 bar.

7. A process as defined in claim 5, wherein the second step is carried out using nitrogen as inert gas for the removal of the solvent.

8. A process as defined in claim 6, wherein the inert gas is passed to the flow plate in the second step at a velocity of from 5 to 100 cm/s.

9. A process as defined in claim 1, wherein the Ziegler-Natta system additionally contains further electron donor compounds as active constituents, in addition to the titanium-containing solid component a) and the aluminum compound co-catalyst b), the further electron donor compounds functioning as further co-catalysts.

* * * * *

UNITED STATES PATENT AND TRADEMARK OFFICE
CERTIFICATE OF CORRECTION

PATENT NO. : 5,658,840
DATED : August 19, 1997
INVENTOR(S) : KÖLLE et al.

It is certified that error appears in the above-identified patent and that said Letters Patent is hereby corrected as shown below:

Column 8, claim 2, line 34, delete "any of".

Column 8, claim 5, line 46, "Wherein" whould be --wherein--.

Signed and Sealed this

Second Day of December, 1997

Attest:

BRUCE LEHMAN

Attesting Officer

Commissioner of Patents and Trademarks